US012747325B2

United States Patent
(12) United States Patent
Rosenow et al.

(10) Patent No.: US 12,747,325 B2
(45) Date of Patent: Sep. 29, 2026

(54) COMPOSITE MATERIAL

(71) Applicant: Polyflow, LLC, Midland, TX (US)

(72) Inventors: Malcolm Rosenow, Aiken, SC (US); Rafik Boubenider, Cypress, TX (US)

(73) Assignee: Polyflow, LLC, Midland, TX (US)

( * ) Notice: Subject to any disclaimer, the term of this patent is extended or adjusted under 35 U.S.C. 154(b) by 207 days.

(21) Appl. No.: 18/204,663

(22) Filed: Jun. 1, 2023

(65) Prior Publication Data

US 2024/0400771 A1 Dec. 5, 2024

(51) Int. Cl.

| | |
|---|---|
| ***C08J 5/04*** | (2006.01) |
| ***B29C 70/14*** | (2006.01) |
| ***B29C 70/44*** | (2006.01) |
| ***B29C 70/70*** | (2006.01) |
| ***B29K 101/12*** | (2006.01) |
| ***B29K 305/00*** | (2006.01) |
| ***B29K 307/04*** | (2006.01) |
| ***B29K 309/08*** | (2006.01) |

(52) U.S. Cl.

CPC .............. *C08J 5/043* (2013.01); *B29C 70/14* (2013.01); *B29C 70/446* (2013.01); *B29C 70/70* (2013.01); *C08J 5/041* (2013.01); *C08J 5/042* (2013.01); *B29K 2101/12* (2013.01); *B29K 2305/00* (2013.01); *B29K 2307/04* (2013.01); *B29K 2309/08* (2013.01); *C08J 2300/22* (2013.01)

(58) Field of Classification Search

CPC ... C08J 5/043; C08J 5/041; C08J 5/042; C08J 2300/22; B29K 2309/08; B29K 2101/12; B29K 2307/04; B29C 70/086; B29C 70/14; B29C 70/446; B29C 70/52; B29C 70/70

USPC .......................................................... 428/298

See application file for complete search history.

(56) References Cited

U.S. PATENT DOCUMENTS

| | | | |
|---|---|---|---|
| 6,106,944 | A | 8/2000 | Heikkila et al. |
| 10,941,259 | B2 | 3/2021 | Van Tooren et al. |
| 2013/0072626 | A1 | 3/2013 | Chen |
| 2015/0226021 | A1 | 8/2015 | Zhang et al. |
| 2020/0361189 | A1 | 11/2020 | Nistala et al. |
| 2020/0408337 | A1 | 12/2020 | Xu et al. |

FOREIGN PATENT DOCUMENTS

| | | | | |
|---|---|---|---|---|
| CN | 102943935 | A | | 2/2013 |
| CN | 105163931 | | * | 5/2018 |
| CN | 113954376 | A | | 1/2022 |
| JP | 2000351858 | A | | 12/2000 |
| WO | 2013139834 | A | | 9/2013 |

OTHER PUBLICATIONS

Svetlana Risteska, Unidirectional Carbon Fiber Reinforced Thermoplastic Tape in Automated Tape Placement Process, Fiber-Reinforced Plastics, Dec. 3, 2021, DOI: http://dx.doi.org/10.5772/intechopen.101110.

* cited by examiner

*Primary Examiner* — Camie S Thompson

(74) *Attorney, Agent, or Firm* — E. Eric Mills; Nicholas P. Stadnyk; Maynard Nexsen PC

(57) ABSTRACT

The present disclosure relates to a composite material for use in a reinforced thermoplastic flexible pipe body, such as a fibre-reinforced composite tape. The present disclosure also relates to a method of producing such a composite material or composite tape, and a method of producing a reinforced thermoplastic flexible pipe comprising said composite material or tape.

17 Claims, 5 Drawing Sheets

COMPOSITE MATERIAL

The present invention relates to a composite material for use in a reinforced thermoplastic flexible pipe body. In particular, but not exclusively, the present invention relates to a fibre-reinforced composite tape. The present invention also relates to a method of producing such a composite material or composite tape, and a method of producing a reinforced thermoplastic flexible pipe comprising said composite material or tape.

BACKGROUND

Traditionally, flexible pipe is utilised to transport production fluids, such as oil and/or gas and/or water, from one location to another. Flexible pipe may be of the type which is used onshore, an example of which is that which follows the America Petroleum Institute specification API 15S, and for which the present invention may be particularly suited. Such pipes may be of a bonded or unbonded construction and in some cases be known as reinforced thermoplastic pipe (RTP) (FIG. 1). Another type of flexible pipe is more suitable for subsea use and is of an unbonded construction, an example of which is that which follows the specification API 17J. A still further type of flexible pipe is of a bonded construction and follows API 17K. Flexible pipe is generally formed as an assembly of a pipe body and one or more end fittings. The pipe body is typically formed as a combination of layered materials that form a fluid and pressure-containing conduit. The pipe structure allows large deflections without causing bending stresses and strains that impair the pipe's functionality over its lifetime. The pipe body is generally built up as a structure including at least one reinforcement layer and polymer fluid sealing layers.

One component that may be present in a flexible pipe is a composite tape, particularly a unidirectional (UD) thermoplastic tape. Such tape may comprise, for example, unidirectional glass fibers and high density polyethylene (HDPE) and can be used, for example, in forming pressure armour layers within a flexible pipe. There are a variety of thermoplastic manufacturing methods that may be used to produce different types of unidirectional tapes. These thermoplastic impregnation processes include powder impregnation, melt impregnation through a wave die, slurry powder and film processes. By these methods, thermoplastic polymers such as PP, PET, PE, HDPE, PA-6, PA-66, PA-11, PA-12, PPA, PVDF, PPS, PEK, PAEK & PEEK can be combined with fibres such as glass, aramid, and carbon, and can be extruded, or pultruded or cut into various widths to form tapes.

However, there are certain challenges associated with the provision of such tapes having appropriate quality and performance for, for example, onshore or sub-sea use. For example, as the melt temperature of molecule weight of the thermoplastic polymer increases, so does the viscosity of the polymers and the degree of difficulty of impregnating or "wetting-out" the fibers without damaging them. In addition, as the operating temperature increases, so does the cost of suitable polymers.

In addition, available sources of these unidirectional tapes are presently limited and may be sensitive to supply or supply chain issues.

Accordingly, there exists a need for an alternative method of producing an elongate fibre-reinforced composite material, for example a unidirectional fiber reinforced thermoplastic tape. There also exists a need for an improved method of producing fibre-reinforced composite materials such as tapes. In addition, there exists a need for an improved fibre-reinforced composite material, which may take the form of a tape.

BRIEF DESCRIPTION OF THE DRAWINGS

Embodiments of the present invention are described, by way of example, with reference to the following figures, in which.

DESCRIPTION

According to a first aspect of the present disclosure there is provided an elongate fibre-reinforced composite material comprising: a composite core material profile comprising a thermoset material impregnated with fibres, wherein at least 90 vol. % of the fibres are at least partially oriented along the longitudinal axis of the composite core material profile; and a thermoplastic polymer at least partly covering the composite core material profile along the longitudinal axis of the material.

According to a further aspect of the present disclosure there is provided a method of forming the fibre-reinforced composite material disclosed herein, said method comprising:

- providing one or more composite core material profiles comprising a thermoset polymer impregnated with fibres, wherein at least 90 vol. % of the fibres are at least partially oriented along the longitudinal axis of the composite core material;
- providing a thermoplastic polymer so that it at least partially covers the one or more composite core material profiles to form an elongate fibre-reinforced composite material; and
- optionally, cutting the elongate fibre-reinforced composite material to form a plurality of lengths, wherein each length of elongate fibre-reinforced composite material comprises at least one composite core material profile at least partially covered along its length by thermoplastic polymer.

According to another aspect there is provided a reinforced thermoplastic pipe body comprising the elongate fibre-reinforced composite material disclosed herein.

According to yet another aspect there is provided a method of forming a reinforced thermoplastic pipe body as disclosed herein.

The elongate fibre-reinforced composite material disclosed herein may take the form of a tape. The elongate fibre-reinforced composite material or tape may be included in a reinforced thermoplastic pipe body.

Figure 2:
FIG. 2 is an example of a prior art glass fibre and HPDE composite tape.

The structure of a prior art unidirectional thermoplastic tape is shown in FIG. 2. The tape 201 shown in FIG. 2 may be made by a one-stage process in which unidirectional fibres 202 are impregnated into a thermoplastic polymer 203 by a method such as powder impregnation, melt impregnation, slurry powder or a film process. The fibre-reinforced thermoplastic polymer may then be extruded, or pultruded, or slit into various widths to form tapes. However, unidirectional tape formed by these methods may be subject to certain disadvantages. Particularly, a higher melt temperature of the thermoplastic polymer, and/or a higher polymer molecular weight, can increase the viscosity of the polymers. This makes impregnation or "wetting out" of the fibres within the polymer difficult, and may also result in damage to the fibres. In addition, in order to work at higher continuous operating temperatures, only certain thermoplastic polymers may be suitable, and these may be expensive. A further issue with known carbon fibre reinforced thermoplastic tapes is that the arrangement of carbon fibres within the tape can mean that the tape is relatively stiff.

In accordance with one aspect of the present invention, there is disclosed an elongate fibre-reinforced composite material comprising: a composite core material profile comprising a thermoset material impregnated with fibres, wherein at least 90 vol. % of the fibres are at least partially oriented along the longitudinal axis of the composite core material profile; and a thermoplastic polymer at least partly covering the composite core material profile along the longitudinal axis of the material. In one embodiment, the composite material comprises two or more profiles.

Figure 3:
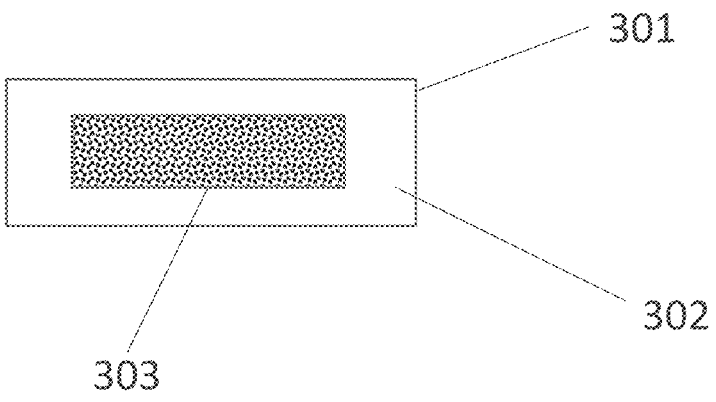
FIG. 3 is an example of a fibre-reinforced composite material profile in accordance with an embodiment of the present disclosure.

An example of a cross-section of an elongate fibre-reinforced composite material profile 301 in accordance with the present disclosure is illustrated by FIG. 3. In FIG. 3, the composite material comprises a thermoplastic outer layer 302 and a composite core material 303.

Figure 4:
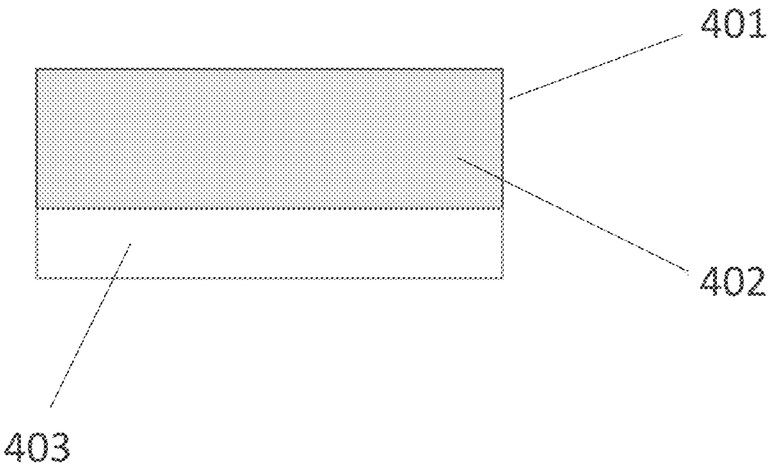
FIG. 4 is an example of a fibre-reinforced composite material profile in accordance with another embodiment of the present disclosure.

A further example of an elongate fibre-reinforced composite material profile 401 in accordance with the present disclosure is illustrated by FIG. 4. In FIG. 4, the thermoplastic polymer 403 does not completely surround the core material profile 402. Instead, the thermoplastic polymer is directly or indirectly bonded to the composite core material profile on one side. In one embodiment, the thermoplastic polymer takes the form of a tape, for example an adhesive tape. Where the thermoplastic polymer is an adhesive tape, the tape is directly adhered to the composite core material profile. An adhesive tape as the thermoplastic may be beneficial as it may enable production of a thinner composite material, due to the low thickness of the adhesive tape. The composite core material profile may have any suitable cross-sectional shape. Preferably, the cross-section of the core material profile is non-circular. A non-circular cross-section may provide increased flexibility of the core, and consequently of the composite material when the composite core material profile is incorporated into an elongate fibre-reinforced composite material. Increased flexibility may make it easier, for example, to wrap a tape comprising said composite core material around a flexible pipe body, or to spool a flexible pipe onto a reel. Examples of preferred cross-sectional shapes include substantially oval, substantially rectangular, substantially square, or substantially Z-shaped. Preferably, the cross-sectional height of the core material is less than the cross-sectional width of the core material, as shown in FIG. 3 and FIG. 4. This may increase flexibility of the elongate fibre-reinforced composite material. In one embodiment, the core material profile has an cross-sectional aspect ratio of from 1000:1 to 1:1, preferably from 500:1 to 20:1, for example from 250:1 to 50:1. The thickness of the core material profile is advantageously no more than 2 mm, for instance no more than 1 mm, for instance no more than 0.5 mm, or as small as 0.2 mm. The thickness of the core material may be optimised to be as small as possible in order to reduce variations in the residual stresses in the reinforcement fibres through the thickness of the core material profile when bent around an underlying layer of flexible pipe body. Where the cross section of the core material profile is not square or rectangular, the aspect ratio may be understood to relate to the longest width and longest thickness of the cross-section of the core material.

The core material includes a plurality of fibres. These fibres may be selected from carbon, ceramic, basalt, glass, or metal fibres, or a combination thereof. Further examples include polymer fibres such as aramid fibre, polyester fibre such as Vectran (a fibre spun from a liquid-crystal polymer (LCP) created by Celanese), or ultra-high molecular weight polyethylene (UHMWPE). Preferably, the fibres are glass fibre or carbon fibre, for example the fibres are glass fibres. It will be understood that a combination of fibres may be used together or separately in proximate bunches or strands. The choice of fibres, or combination of fibres, may provide certain properties that may be imparted by a particular type of fibres, or combination of fibres. These properties may be imparted to the entire composite material, or to a portion of the composite material. Preferably, the fibres or combination of fibres are distributed throughout the whole of the composite core material profile.

The plurality of fibres may be present within the core material as individual fibres, which may be distributed throughout the core material. Alternatively, the fibres may be present in the core material in the form of one or more bundles or strands of fibres, or in the form of a plurality of strands of fibres twisted together, wherein the bundles or strands or twisted strands of fibres are distributed throughout the core material. The bundles or strands may consist entirely of fibres. Alternatively, the bundles or strands may comprise at least 80 wt % fibres, or at least 90 wt % fibres, or at least 95 wt % fibres and may further comprise a binding agent or adhesive which may facilitate manufacturing and/or alignment of the fibres and/or the bonding of the thermoset (matrix) material to the reinforcement fibres.

Preferably, the majority of the reinforcing fibres (or bundles or strands of fibres) are oriented lengthways along the longitudinal axis of the core material, e.g. at least 90% by volume of the reinforcing fibres may be oriented lengthways along the longitudinal axis of the core material, for example at least 95% by volume, or at least 98% by volume of the fibres may be at least partially oriented along the longitudinal axis of the material. Where the composite core material takes the form of a tape, at least 90 vol % of the reinforcing fibres are at least partially oriented along the longitudinal axis of the tape. Preferably, at least 90 vol %, preferably at least 95 vol %, for example at least 98 vol % of the fibres are oriented substantially unidirectionally within the core material. The volume percentage of the reinforcing fibres within the core material may be measured by determining the fraction fill of the reinforcing fibres within a cross section of the core material.

Alternatively, the quantity of reinforcing fibres may be expressed by means of their weight percentage, for example at least 90 wt % of the reinforcing fibres may be oriented lengthways along the longitudinal axis of the core material, for example, at least 95 wt %, or at least 98 wt % of the fibres may be at least partially oriented along the longitudinal axis of the material. In this regard, disclosed herein is an elongate fibre-reinforced composite material comprising: a composite core material profile comprising a thermoset material impregnated with fibres, wherein at least 90 wt. % of the fibres are at least partially oriented along the longitudinal axis of the composite core material profile; and a thermoplastic polymer at least partly covering the composite core material profile along the longitudinal axis of the material.

Preferably, the fibres extend through the whole length of the core material. Likewise, when the core material is incorporated into an elongate composite material, the fibres preferably extend along an axis of the composite material, preferably along the longitudinal axis of the composite material. Where the material is a tape, the fibres preferably extend along the whole length of the tape.

Advantageously the surface of the core material comprises at least a portion of the fibres contained in the core material so that they are exposed directly to the thermoplastic polymer of the outer layer. Optionally non-continuous fibres or particles may be dispersed in, or applied to the surface of, the thermoset matrix material prior to or during curing, to provide exposed fibres at the surface of the core material.

Any suitable thermoset material may be included in the core material. For example, the thermoset material may be derived from a resin. Preferably, the resin is a thermosetting resin. The resin may be selected from vinyl esters, vinyl ester-epoxy blends, polyurethane, polyester, phenol resins or mixtures thereof. Preferably, the composite core material is formed by combining a plurality of fibres with a thermosetting resin to form a composite core material profile, for example via a pultrusion process.

It is possible to obtain a high percentage of fibres in the composite core material profile, i.e. a high level of compaction of fibres within the profile. This may be achieved due to relatively low viscosity of the thermosetting resin. Particularly, where the composite material is in the form of a tape, a high percentage of fibres may be achieved in comparison to prior thermoplastic tapes in which the high viscosity of the thermoplastic polymer can limit impregnation and wet out. For example, in the present invention the fibres may be present in the core in an amount of from 50 to 99 vol. %, preferably 60 to 95 vol. %, for example 70 to 80 vol. % based on the total weight of the fibres and thermoset polymer.

In addition to the core material, the elongate fibre-reinforced composite material further comprises a thermoplastic polymer. The thermoplastic polymer at least partly covers the composite core material profile. In one embodiment, the composite material comprises an outer layer comprising a thermoplastic polymer. The thermoplastic polymer preferably surrounds the core along a length of the material, and preferably completely covers the composite core material profile. Where the composite material is a tape, the thermoplastic polymer preferably surrounds the core material along the full length of the tape. Alternatively, the thermoplastic polymer forms a layer on a surface of the composite core material, as shown in FIG. 4. For the avoidance of doubt, the cross-sectional ends of the material or tape are not surrounded by the thermoplastic polymer.

Optionally a plurality of core material elements may be incorporated into one fibre reinforced composite material tape. These core material elements may be provided on top of each other, with the long cross-sectional sides of the core material facing each other, or may be aligned next to each other to provide a wider, flatter tape wherein the short cross-sectional sides of the core material are adjacent to that of a neighbouring core material element. In this embodiment the thermoplastic polymer outer layer may substantially or completely cover the plurality of core material elements and bind them together as one tape. In another embodiment, a plurality of core material elements may be arranged on a layer of thermoplastic polymer.

Any suitable thermoplastic polymer may be used. Examples of thermoplastic polymers include polyether ketone ketone (PEKK), polyether ether ketone (PEEK), polyaryl ether ketone (PAEK), polyphenylene sulfide (PPS), polyetherimide (PEI), polyamides such as PA-6, polyether sulfone (PES or PESU), polypropylene (PP), polyethylene such as PE-RT (polyethylene at raised temperature resistance) and mixtures thereof. Preferably, the thermoplastic polymer is extruded with profiles or ribbons of the composite core material to form the fibre-reinforced composite material, as described herein.

In addition to the thermoplastic polymer, the outer layer may optionally include additives such as adhesion promoting species, filler particles such as colorants, bulking agents, reinforcement particles or fibres of ceramics, metals, metal oxides and the like. These additives may, for example, improve the flexibility of the composite material, and/or may improve the adherence of the thermoplastic polymer to the thermoset core material, and/or may improve toughness and/or hardness of the thermoplastic polymer to resist handling damage and/or load transfer between the thermoplastic polymer and the thermoset core material.

The outer layer may form from 1 wt % to 50 wt %, preferably from 10 wt % to 40 wt %, for example 20% wt to 30 wt % of the fibre-reinforced composite material.

The fibres may be present in the fibre-reinforced composite material in an amount of from 50 to 95 vol. %, preferably 70 to 90 vol. %, more preferably 75 to 85 vol. % based on the total weight of the composite core material profile and the thermoplastic polymer. Advantageously, the present invention may provide an increased fibre weight percentage when compared to currently available unidirectional tapes, which may have a fibre weight percentage range of from 35 to 65 wt % depending on the fibre type and thermoplastic polymer used. In these prior UD-tapes, achieving a high volume fraction may be difficult due to the high viscosity of polymer needed to achieve good fibre wet-out and compaction of the fibre in the polymer.

The composite core material profile may be directly or indirectly bonded to the thermoplastic polymer. In some embodiments, the core material profile may be indirectly bonded to the thermoplastic polymer by means of an adhesive or binder. The adhesive or binder may be present between the core material profile and the thermoplastic polymer in the form of a tie layer. The binder may, for example, increase adhesion between the thermosetting polymer resin and the thermoplastic polymer. In an embodiment, the adhesive or binder may form a binding layer or tie layer between the core material and thermoplastic polymer, such that the core material is indirectly bonded to the thermoplastic polymer. The adhesive or binder may include, for example, epoxy groups. For example, the binder may be a polymer selected from, for example, an epoxidized polybutadiene, an epoxidized polyisoprene, poly(glycidyl methacrylate) or a combination thereof. Alternatively, the composite core material profile may be directly bonded to the thermoplastic polymer through chemical or mechanical bonding.

Where two or more profiles are present within the elongate fibre reinforced composite material, it is appreciated that these profiles may be connected by means other than the thermoplastic polymer as described herein. For example, a number of profiles may be connected by stitching together the profiles.

The shape of the elongate fibre-reinforced composite material is not particularly limited. In one embodiment, the composite material has an aspect ratio of from 20:1 to 2:1, preferably from 15:1 to 5:1, for example from 10:1 to 8:1. Where the fibre-reinforced composite material takes the form of a tape, the tape may have a width of 20 to 200 mm, preferably 50 to 150 mm, for example 75 to 100 mm. The tape may have any suitable thickness, such as 0.3 to 4.0 mm, preferably 0.5 to 3.0 mm, for example 1 to 2 mm.

In a composite tape according to the present disclosure, the tape may comprise a composite core material comprising a thermoset material impregnated with fibres, wherein at least 90 vol % of the fibres are at least partially oriented along the longitudinal axis of the tape, and an outer layer comprising a thermoplastic polymer. Preferably, the fibres extend substantially unidirectionally along the whole length of the tape.

The present invention can allow for the production of long composite tapes, for example wherein the length of the tape greater than 700 m, and preferably greater than 1000 m. The length of the composite tape may be limited only by the length of tape that can be spooled, or by the weight limitation of a spool of tape. For example, spooled tape lengths of greater than 1250 m, or greater than 1500 m, may be achieved. This may be favourably compared with currently available thermoplastic tapes which may be limited to a spooled length of less than 750 m. Thus, a tape in accordance with the present invention may have the advantage of providing increased (spooled) length of the composite tape.

By ensuring that the cross-sectional height of the composite core material profile is less than its width, this can increase flexibility of the tape during winding, for example. A circular core is not preferred as this may increase stiffness of the composite tape. The cross-sectional height of the core material may be, for example 0.2 mm to 2 mm, preferably 0.4 to 1.5 mm, for example 0.7 to 1 mm. The cross-sectional width of the core may be, for example, 15 mm to 250 mm, 50 mm to 200 mm, for example 100 mm to 150 mm. Where the cross section of the core material is not square or rectangular, the cross sectional dimensions may be understood to refer to the longest width and longest length of the core.

The composite material of the present invention may have particularly advantageous properties. For example, the composite material may have a tensile strength, as measured using ASTM D3039 within the range of 1000 MPa to 1500 MPa, preferably 1200 to 1400 MPa, for example 1250 to 1300 MPa. Thus, the composite material or tape as disclosed herein may have a higher tensile strength than currently-available composite tapes. For example, a current glass fibre/HDPE tape may have a tensile strength of approximately 830 MPa. Thus, a composite tape as disclosed herein may provide a greater than 50% performance gain improvement. As a result, the thickness of the overall pipe composite section may be reduced, as an acceptable tensile strength may be achieved with fewer tape passes. This may also provide an improvement in production throughput, as more pipe may be manufactured per hour due to the decrease in number of tape passes required, and may reduce manufacturing or material costs.

In addition, the higher tensile strength of a composite tape or material as disclosed herein can result in a reinforced thermoplastic pipe with a higher pressure rating, i.e. a higher internal pressure rating. For example, pressure ratings of greater than 2000 psi, preferably greater than 2500 psi, for example greater than 3000 psi may be achieved.

The composite tape as disclosed herein may have an improved short beam strength value. Particularly, the composite tape may have a short beam strength value of up to 60 MPa (core material geometry dependent) in accordance with ASTM D2344. For example, the composite tape may have a short beam strength of greater than 30 MPa, preferably greater than 40 MPa, for example greater than 50 MPa. This compares favourably with the short beam strength of current tapes which may have a short beam strength in the range of 28 MPa. The higher short beam strength of the composite tape disclosed herein may reduce or eliminate neutral axis cracking during winding of a pipe onto a reel.

The composite material or tape may further comprise features such as one or more vents or pathways. These may serve to provide means to deal with permeated gas species which may be present within, for example, the annulus of a flexible pipe. The vent(s) or pathway(s) may be incorporated within the composite material, extending along a flexible pipe to an end fitting where the permeated gas may be released via, for example, a purge valve.

The composite material as disclosed herein, and in particular a composite tape, may be employed in a range of applications in a reinforced thermoplastic pipe body. For example, a fibre-reinforced composite material in accordance with the present invention may be used to form one or more layers within a reinforced thermoplastic pipe body. In accordance with an aspect of the present invention, there is disclosed a reinforced thermoplastic pipe body comprising the elongate fibre-reinforced composite material disclosed herein. Said composite material may be applied by helically winding around a layer of the reinforced thermoplastic pipe body. For example, the composite material may be helically wrapped around a tubular inner liner layer, for example a thermoplastic tubular liner. Additionally or alternatively, an outer sheathing layer, for example a thermoplastic outer sheathing layer, may be located radially outside a layer comprising the fibre-reinforced composite material. In one embodiment, the elongate fibre-reinforced composite material may be bonded to at least one of a thermoplastic tubular liner layer and a thermoplastic outer sheathing layer.

Accordingly, also disclosed is a method of forming a reinforced thermoplastic pipe body as disclosed herein, said method comprising helically wrapping at least one layer of fibre-reinforced composite material around a tubular inner liner layer. The method may also include providing an outer layer, for example a thermoplastic outer sheathing layer, radially outside of the fibre-reinforced composite material layer. Said method may optionally include bonding the composite material to at least one of the tubular liner layer and/or the outer sheathing layer. Bonding may be performed using at least one of heat (in the form of hot gas, radiation or laser energy), pressure and adhesive bonding.

Figure 1:
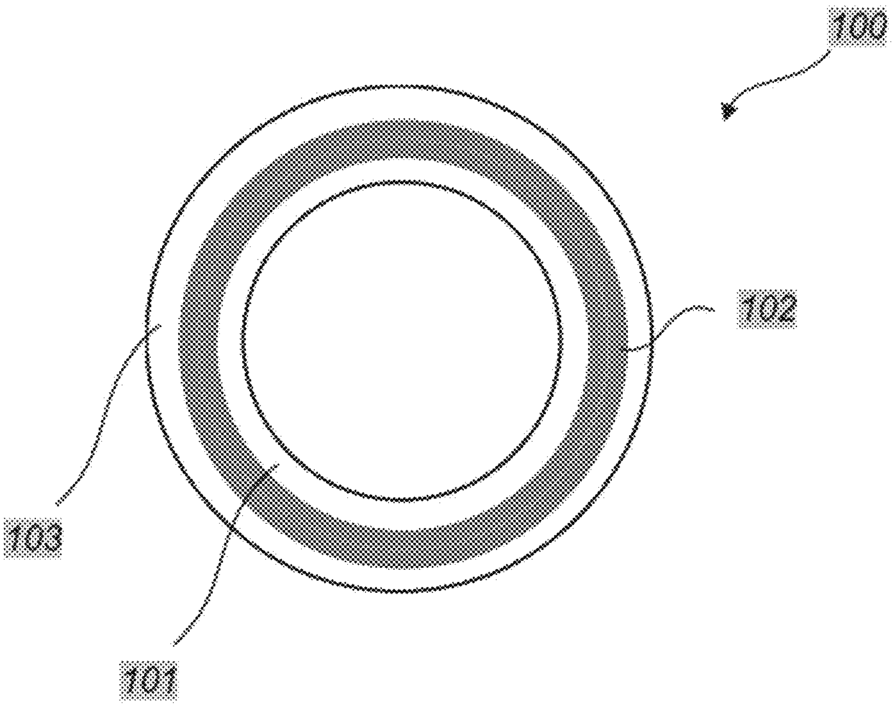
FIG. 1 is an example of a reinforced thermoplastic flexible pipe body in accordance with an embodiment of the present disclosure.

It will be understood that a flexible pipe is an assembly of a portion of a pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. For example, the pipe body may be formed from polymer layers, composite layers, metallic layers or a combination of different materials. It is to be further noted that the layer thicknesses are shown for illustrative purposes only.

Flexible pipe such as reinforced thermoplastic pipe (RTP) may either be of an unbonded construction, where the layers of the pipe are unbonded to each other, i.e. the inner fluid containing polymer liner layer is not bonded to the reinforcement layer, which is in turn not bonded to the outer protective sheath polymer layer, or of a bonded construction, i.e. all layers are bonded to each other as part of the pipe manufacturing resulting in a pipe which is in effect a single, consolidated layer comprising sub-layers. RTP of either type may be suitable for use in transporting and/or distributing oilfield fluids, such as water, gas (methane, ethane, $CO_2$ etc.) and/or the transport and distribution of hydrocarbon liquids, or other fluids such as hydrogen. may be used onshore (over land) or in very shallow water applications (for instance less than 50 m water depth).

Structurally, reinforced thermoplastic pipe body may comprise a simple construction, comprising two or more polymer layers each of which may be similar or different polymer types (see for example US2018/0187802A1). See also American Petroleum Institute Specification 15S as a reference for an example of these types of pipe. The inner and outer polymer layers (often termed a liner and protective sheath respectively) may be extruded polymers of at least one type of polymer. Aptly for some applications the inner polymer layer may comprise sub-layers similar or different polymer compositions which are co-extruded to form a liner.

The multilayer RTP related to the invention may be suitable for internal pressures up to 5000 psi. Multilayer RTP may comprise MDPE, HDPE, XLPE, PE-RT, polypropylene (commercial polyolefin grades or grades with additives for temperature and chemical stability), polyamides (e.g. PA-12, PA-66, PA-6), thermoplastic elastomers, flexible polyvinyl chloride, Acrylonitrile butadiene styrene (ABS), polyphenylene sulfide (PPS), PFA, MFA, or other polymers or polymer alloys. Multilayer RTP may also comprise filled polymers where the polymer contains a portion of a filler material, such as fibres or particles.

The multilayer RTP body may comprise a multi-layer structure incorporating at least one intermediate reinforcement layer to withstand internal pressure and/or tension in the pipe when in use. Such reinforcement layers may comprise spirally wound reinforcement tapes, comprising at least one polymer layer reinforced with filaments of any or a combination of glass, carbon, basalt, aramid, tensilised polyester or metal fibres or wires. In this case the reinforcements may be substantially aligned in the longitudinal direction of the tape and embedded within, or adhered to, or sandwiched between, the at least one polymer layer. A reinforcement tape may also comprise warp and weft fibres of similar or different materials or sizes so that the longitudinally aligned fibres/bundles/strands are bound or fixed in position with respect to one another in a woven fibre tape. The reinforcements may comprise long discrete fibres, or may be bundled, or twisted together as strands. Alternatively, reinforcement fibres may be braided around the pipe, or bundles of fibres may be constrained within a braided element, the braided elements being spirally wound or braided around the inner polymer barrier layer of the pipe as reinforcements. Fibres and/or strands or braids of fibres may be wound around the pipe in a helical manner, with lay angles optimised for pipe performance (the higher the angle the greater the pressure retainment capability, the lower the angle the greater the tension capability), or interwoven into a braid around the pipe. Layers of reinforcements may be applied sequentially at different angles to optimise and torsionally balance the structure in manufacture and use.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector. In the example pipe body 100 shown in FIG. 1, the pipe body includes in cross section a fluid retaining liner 101 which may comprise a polymer layer. This may ensure internal fluid integrity. It is to be understood that this layer may itself comprise a number of sub-layers. It will be appreciated that the fluid retaining liner 101 may be referred to as a liner. An intermediate layer, or intermediate reinforcement layer 102, and an outer protective sheath 103 which may comprise a polymer layer that may be used to protect the pipe against penetration of water and other external environments that might damage the reinforcement layer.

Also disclosed herein is a method of forming a fibre-reinforced composite material. Particularly, disclosed herein is a method of forming an elongate fibre-reinforced composite material as disclosed herein, for example for forming a fibre-reinforced composite tape. Accordingly, according to one aspect of the invention there is provided a method of forming the elongate fibre-reinforced composite material as disclosed herein, said method comprising providing one or more composite core material profiles comprising a thermoset polymer impregnated with fibres, wherein at least 90 vol. % of the fibres are at least partially oriented along the longitudinal axis of the composite core material; providing a thermoplastic polymer so that it at least partially covers the composite core material profiles to form an elongate fibre-reinforced composite material; and optionally, cutting the elongate fibre-reinforced composite material to form a plurality of lengths of elongate fibre-reinforced composite material, wherein each length of elongate fibre-reinforced composite material comprises at least one composite core material profile at least partially covered along its length by thermoplastic polymer.

The method comprises providing one or more composite core material profiles comprising a thermoset polymer impregnated with fibres, wherein at least 90 vol % of the fibres are at least partially oriented along the longitudinal axis of the composite core material profile.

Each profile may be in the form of a tape, as described herein, or a ribbon. The profiles may have any suitable cross-sectional shape, preferably non-circular. Examples of preferred cross-sectional shapes include substantially oval, substantially rectangular, substantially square, or substantially Z-shaped. Preferably, the cross-sectional height of the core material profile is less than the cross-sectional width of the core material, as shown in FIG. 3. This may increase flexibility of the composite material. In one embodiment, the core material profile has a cross-sectional aspect ratio of from 1000:1 to 1:1, preferably from 500:1 to 5:1, for example from 250:1 to 20:1. The cross-sectional height of the profiles may be from 1 mm to 6 mm, preferably from 1.5 mm to 5 mm, for example from 2 mm to 4 mm. The cross-sectional width of the profiles may be from 5 mm to 100 mm, preferably from 10 mm to 70 mm, for example from 20 mm to 50 mm. The aspect ratio of the height and width of the core material will be dictated by the profile shape. However, some embodiments will naturally prefer a more equal aspect ratio than others. The preferred aspect ratio may be dependent on the flexible pipe body diameter in which the composite material or tape is included, and the desired lay angle of the composite reinforcement material or tape. As noted, the aspect ratio may provide improved flexibility.

The volume fraction percentage of fibres in the thermoset polymer is as described above in relation to the composite material. As an example, calculation of a volume fraction percentage may be performed by reference to the following:

$$Vf = Wf \times \rho c/\rho f$$

where:

Wf=weight fraction (for example, 0.8, i.e. Wf 80%)

ρc=density of composite

ρf=density of fibre (an exemplary glass fibre density is 2.56 g/cc)

Density of the composite material can be determined by:

$$\rho c = 1/[(Wf/\rho f) + (Wm/\rho m)] = 1/[(Wf/\rho f) + ((1 - Wf)/\rho m)]$$

where:

Wm=weight of matrix (polymer)

ρm=density of matrix (for example 1.4 g/cc (estimated, dependent on resin))

Based on the above, density of an example glass fibre composite may be calculated as:

$$\rho c = 1/[(Wf/\rho f) + ((1 - Wf)/\rho m)] = 1/[(0.8/2.56) + ((1 - .8)/1.4)] = 2.196 \text{ g/cc}$$

This allows calculation of a volume fraction of $$Vf = Wf \times \rho c/\rho f = 0.8 \times 2.196/2.56 = 0.686$$

$$Vf = 68.$$

The composite core material profiles may be commercially available. Examples of suitable commercially available materials include pultruded ribbons of glass and carbon reinforcements in thermoset polymer systems. Determination of the weight percentage of fibre in these profiles may be performed by burning off the polymer for instance in accordance with ASTM D2584.

Alternatively, the composite core material profiles may be formed by combining fibres and a thermosetting resin, for example by pultrusion. Suitable composite core material profiles are already described herein.

As defined previously in relation to the fibre-reinforced composite material, the fibres may be selected from carbon, ceramic, basalt, glass, or metal fibres, and may preferably be glass fibres or carbon fibres. Preferably, the length of the fibres is sufficiently long that they extend through the full length of a composite material, for example the fibres may extend substantially unidirectionally along the whole length of a composite tape. In one example, the length of the fibres may be at least 700 m, for example at least 1000 m. In one example, prior to combining with a thermosetting resin, the fibres may be formed into strands. For example, the fibres may be formed into twisted strands.

To form said composite core material profiles, a thermosetting resin may be combined with a plurality of fibres, or a plurality of strands of fibres. This may be achieved by injection of the thermosetting resin. For example, the thermosetting resin may be injected into a pultrusion die. The fibres or strands or fibres may be passed through the pultrusion die and combined with the thermosetting resin. Alternatively, the thermosetting resin may be combined with the fibres before passing through the pultrusion die. For example, the fibres may be impregnated in the thermosetting resin.

The thermosetting resin may be as described previously in relation to the fibre-reinforced composite material. For example, the resin may be selected from vinyl esters, vinyl ester-epoxy blends, polyurethane, polyester, phenol resins or mixtures thereof.

One or more fibres or strands of fibres may be passed through the pultrusion die to form one or more profiles. The pultrusion die defines a pultrusion path through which a combination of resin and fibres pass, and determines the shape of the resulting profiles. The pultrusion die may include a heated section. Following pultrusion, the one or more profiles may optionally be subjected to a curing process. For example, the curing process may comprise the application of at least one of heat, infra-red radiation, or microwaves to the profiles. The composite profiles may then be spooled.

Figure 5:
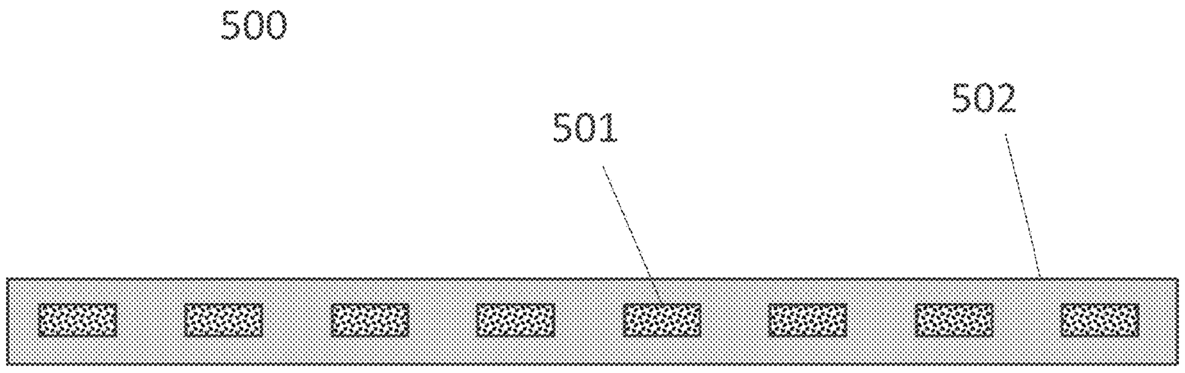
FIG. 5 is an example of an extruded composite material in accordance with an embodiment of the present disclosure.

In the disclosed method, a thermoplastic polymer is provided so that it at least partially covers the at least one composite core material profiles to form an elongate fibre-reinforced composite material. In one embodiment, one or more composite core material profiles are extruded with a thermoplastic polymer to form a fibre-reinforced composite material 500. A die or orifice, preferably a rectangular die, can be used to extrude the thermoplastic polymer 502 with the one or more profiles 501. The guides for the core material profiles feeding the core material profiles into the die may enable even spacing of a plurality of profiles across the width of the die. As shown in FIG. 5, the one or more profiles may be spaced evenly across the width of a die with a space between each of the profiles such that, following extrusion, the thermoplastic polymer surrounds each of the profiles along the length of each of the profiles.

Extrusion of a single composite core material profile with thermoplastic polymer can provide a fibre-reinforced composite material where the core material is surrounded by the thermoplastic polymer along its length. For example, a fibre-reinforced composite tape may be formed. Alternatively, where two or more profiles are extruded with a thermoplastic polymer, the resulting extruded material may be cut to form a plurality of lengths of fibre-reinforced composite material. For example, as shown in FIG. 5, the extruded material may include a plurality of composite profiles which are evenly spaced and arranged essentially parallel to each other, wherein each of the profiles is surrounded along its length by extruded thermoplastic polymer. In order to form lengths of composite material, e.g. tapes, the extruded material may be cut such that each length comprises a composite core material profile surrounded along its length by thermoplastic polymer. Alternatively, each length may comprise two or more composite core material profiles.

The thermoplastic polymer may be introduced in the form of pellets or granules. On melting of the thermoplastic polymer, the polymer may be combined with the one or more profiles. As described in relation to the fibre-reinforced composite material, any suitable thermoplastic polymer may be used to form the outer layer. Examples of thermoplastic polymers include polyether ketone ketone (PEKK), polyether ether ketone (PEEK), polyaryl ether ketone (PAEK), polyphenylene sulfide (PPS), polyetherimide (PEI), polyamides such as PA-6, polyether sulfone (PES or PESU), polypropylene (PP), polyethylene such as PE-RT (polyethylene at raised temperature resistance) and mixtures thereof.

By this two-step process, it is easier to extrude a high temperature thermoplastic over the pultruded profiles than to combine fibres directly into a thermoplastic melt. The disclosed method avoids difficulties that may result from the high viscosity of high temperature thermoplastics, namely in relation to wet out and impregnation of the fibres. Use of a fibre-reinforced thermoset core may also reduce cost, as a smaller amount of high temperature thermoplastic polymer is required in the composite material.

Alternatively, a thermoplastic polymer may be applied to the at least one composite core material profiles by chemical or mechanical bonding. For example, wherein the thermoplastic polymer takes the form of an adhesive tape, one or more profiles may be arranged on the adhesive tape. Preferably, the profiles may be spaced on the adhesive tape such that there is a gap between each profile. The adhesive tape may then be cut to form a plurality of lengths of elongate fibre-reinforced composite material, in which each length preferable comprises a profile, and a layer of thermoplastic polymer tape bonded to one side of the profile. Use of an adhesive thermoplastic tape may be beneficial due to a more simple production process, as no extrusion is required. This may also provide cost benefits.

EXAMPLE

Table 1 provides a comparison of commercially available thermoplastic glass fibre tapes with pultruded thermoset glass fibres profiles in accordance with the present invention. The commercially available thermoplastic glass fibres tapes (Celanese, DSM, Toray, Trusmax) include glass fibres distributed through a thermoplastic polymer. In the pultruded thermoset glass fibres profiles, glass fibres are combined with a thermosetting material by pultrusion. As shown in Table 1, the pultruded thermoset may provide advantageous properties.

The pultruded thermoset profiles identified in Table 1 may be combined with thermoplastic polymer to provide the composite material according to the present invention.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise. As used herein, the term "about" is used to provide flexibility to a range endpoint by providing that a given value may be "a little above" or "a little below" the endpoint. The degree of flexibility of this term can be dictated by the particular variable and can be determined based on experience and the associated description herein.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

TABLE 1

| | Thermoplastic tapes | | | | Pultruded thermoset | | | | |
|---|---|---|---|---|---|---|---|---|---|
| | Supplier 1 | Supplier 2 | Supplier 3 | Supplier 4 | Supplier 5 | Supplier 6 | Supplier 7 | Supplier 8 | Supplier 9 |
| Fiber type | Glass Fiber | Glass Fiber | Glass Fiber | Glass Fiber | Glass Fiber | Glass Fiber | Glass Fiber | Glass Fiber | Glass Fiber |
| Diameter rod (mm) | — | — | — | — | — | 3.18 | 3.18 | 2.3 | 2.55 |
| Tensile strength (MPa) | 776 | 760 | 900 | 830 | 827 | 965.5 | 551-690 | 1231 | 1300 |
| Tensile modulus (GPa) | 34.2 | 33 | 30 | 32 | 41.4 | 48.3 | 41.4-55.2 | — | 50 |
| Fibre Weight (wt %) | 60 | 60 | 60 | 60 | 75 | 78-84 | 70-75 | — | 80 |
| Fibre volume (Vf %) | 44 | 41 | — | 34.8 | — | — | — | — | — |
| Density (g/cc) | 1.88 | 1.77 | 1.73 | 1.52 | 2 | 2.1 | 1.8-2.1 | 3.5 | 3 |
| Tg (° C.) | 90 | 125 | 47 | 38 | — | 200 | 121-163 | 200 | 200 |
| Matrix material | PPS | PPA | PA6 | HDPE | — | PU | Vinyl Ester | — | — |

The reader's attention is directed to all papers and documents which are filed concurrently with or previous to this specification in connection with this application and which are open to public inspection with this specification, and the contents of all such papers and documents are incorporated herein by reference.

The invention claimed is:

1. A reinforced thermoplastic pipe body comprising an elongate fibre-reinforced composite material, wherein the elongate fibre-reinforced composite comprises:

a composite core material profile comprising a thermoset material impregnated with fibres, wherein the fibres are selected from ceramic fibres, basalt fibres and glass fibres, and at least 90 vol. % of the fibres are at least partially oriented along the longitudinal axis of the composite core material profile;

a thermoplastic polymer at least partly covering the composite core material profile along the longitudinal axis of the material; and wherein the composite material also comprises an anti-permeation foil substantially across the width of the composite material.

2. The reinforced thermoplastic pipe body of claim 1 wherein an elongate fibre-reinforced composite material is helically wrapped around a thermoplastic tubular liner layer to form a layer, optionally further comprising a thermoplastic outer sheathing layer radially outside the layer comprising the elongate fibre-reinforced composite material.

3. The reinforced thermoplastic pipe body of claim 1, wherein the thermoplastic polymer substantially or completely covers the composite core material profile along the longitudinal axis of the composite material.

4. The reinforced thermoplastic pipe body of claim 1, wherein the fibres are present in the composite core material profile in an amount of from 50 to 95 vol. % based on the total weight of the composite material.

5. The reinforced thermoplastic pipe body of claim 1, wherein the fibres are arranged in strands.

6. The reinforced thermoplastic pipe body of claim 5, wherein the fibres are arranged as twisted strands of fibres.

7. The reinforced thermoplastic pipe body of claim 1, wherein the composite material has an aspect ratio of from 20:1 to 2:1.

8. The reinforced thermoplastic pipe body of claim 7, wherein the aspect ratio is from 15:1 to 5:1.

9. The reinforced thermoplastic pipe body of claim 8, wherein the aspect ratio is from 10:1 to 8:1.

10. The reinforced thermoplastic pipe body of claim 1, wherein the fibres are present in the composite core material profile in an amount of from 50 to 99 vol. % based on the total weight of the fibres and thermoset material.

11. The reinforced thermoplastic pipe body of claim 1, wherein the thermoplastic polymer is selected from polyether ketone ketone, polyether ether ketone, polyaryl ether ketone, polyphenylene sulfide, polyetherimide, polyamide, polyether sulfone, polypropylene, polyethylene and mixtures thereof, optionally including additives to improve flexibility and/or improve adherence to thermoset polymers.

12. The reinforced thermoplastic pipe body of claim 1, wherein the thermoset material is formed from a thermosetting resin selected from a vinyl ester, vinyl ester-epoxy blend, polyurethane, polyester, phenolic resin and mixtures thereof.

13. The reinforced thermoplastic pipe body of claim 1, wherein the composite core material profile has a non-circular cross sectional shape.

14. The reinforced thermoplastic pipe body of claim 1, wherein the composite material is a tape, optionally wherein the tape has a length of greater than 700 m.

15. The reinforced thermoplastic pipe body of claim 14, wherein the fibres extend substantially unidirectionally along the whole length of the tape.

16. The reinforced thermoplastic pipe body of claim 1, wherein the composite core material profile is bonded to the thermoplastic polymer using adhesive, chemical or mechanical bonding.

17. The reinforced thermoplastic pipe body of claim 1, wherein the composite material comprises at least one of a vent or path.

* * * * *